United States Patent [19]

Mortimer et al.

[11] Patent Number: 4,546,605
[45] Date of Patent: Oct. 15, 1985

[54] HEAT EXCHANGE SYSTEM

[75] Inventors: Thomas P. Mortimer, Bolton; Gabriel L. Suciu, Storrs, both of Conn.

[73] Assignee: United Technologies Corporation, Hartford, Conn.

[21] Appl. No.: 562,126

[22] Filed: Dec. 16, 1983

[51] Int. Cl.[4] .............................................. F02K 3/06
[52] U.S. Cl. ..................................... 60/226.1; 60/267; 60/39.07; 60/39.08; 60/39.83; 184/6.11
[58] Field of Search ................ 60/226.1, 39.08, 39.83, 60/39.07, 266, 267; 184/6.11; 415/110, 111, 112, 113, 175, 176, 177, 178

[56] References Cited

U.S. PATENT DOCUMENTS

| 2,487,842 | 11/1949 | Whiteman et al. | 60/39.08 |
| 2,625,009 | 1/1953 | Leggett et al. | 60/39.08 X |
| 2,791,090 | 5/1957 | Hooker | 60/39.83 X |
| 2,865,580 | 12/1958 | Marshall | 60/39.08 X |
| 3,080,716 | 3/1963 | Cummings et al. | 60/39.83 X |
| 3,898,799 | 8/1975 | Pollert et al. | 60/226.1 |
| 4,151,710 | 5/1979 | Griffin et al. | 60/226.1 X |
| 4,254,618 | 3/1981 | Elovic | 60/226.1 |
| 4,463,552 | 8/1984 | Monhardt et al. | 60/226.1 |
| 4,474,001 | 10/1984 | Griffin et al. | 60/226.1 X |

*Primary Examiner*—Carlton R. Croyle
*Assistant Examiner*—Jeffrey A. Simenauer
*Attorney, Agent, or Firm*—Norman Friedland

[57] ABSTRACT

An air/oil heat exchanger is relatively interconnected to the compressor discharge air or fan discharge air of a fan-jet engine to minimize the size of the heat exchanger core so as to be able to locate the heat exchanger within the intermediate case between struts. The plumbing may be combined with the surge bleed system to simplify the systems and reduce weight and cost.

3 Claims, 2 Drawing Figures

4,546,605

HEAT EXCHANGE SYSTEM

DESCRIPTION

1. Technical Field

This invention relates to a fan-jet engine and particularly to an air/oil heat exchange system and a combined surge bleed and indirect heat exchange system.

2. Background Art

As is well known, it is common practice to provide in certain aircraft engine installations a compressor bleed system that bleeds the excess quantity of air in the compressor during certain engine operations so as to prevent surge, which is a well known phenomenon in axial flow compressors. It is also customary to provide means for cooling engine oil by placing it in indirect heat exchange relationship with engine fan discharge air. In some installations the air/oil heat exchanger would be mounted directly in the fan discharge stream and in others it would be nestled in the nacelle and attached to the exterior of the engine's outer case.

Obviously, because the heat exchanger protrudes into the air stream, it presents an obstacle to the air flowing through and around it and hence, imposes an undesirable loss of pressure which detracts from the overall engine performance.

We have found that we can obviate these problems by utilizing compressor pressure during certain operating conditions of the engine and utilizing fan discharge air during other conditions. This allows the core of the heat exchanger to be smaller in size for the same heat transfer as was the case in the larger heretofore heat exchangers, inasmuch as this system takes advantage of the higher pressures available at the given engine operating conditions, which size allows the heat exchanger to be installed inside the engine's case.

In the installations that includes compressor surge bleed systems, and it being compatible therewith, it is also possible to combine both the heat exchange system and the surge bleed system with an attendant reduction in plumbing and complex flow passages resulting in a heat exchange system that is less expensive and lighter in weight than the heretofore used systems.

DISCLOSURE OF INVENTION

An object of this invention is to provide for a fan-jet engine an improved heat exchange system for cooling oil by selectively utilizing fan and compressor surge bleed air at given engine operating conditions. A feature of this invention is the ability to make the heat exchanger sufficiently small so as to fit within the engine's case, and particularly between struts of the intermediate case of a twin spool compressor.

Another feature of this invention is to combine the compressor surge bleed system with the air/oil heat exchange system so as to simplify the overall heat exchange system.

Other features and advantages will be apparent from the specification and claims and from the accompanying drawings which illustrate an embodiment of the invention.

BEST MODE FOR CARRYING OUT THE INVENTION

Figure 1:
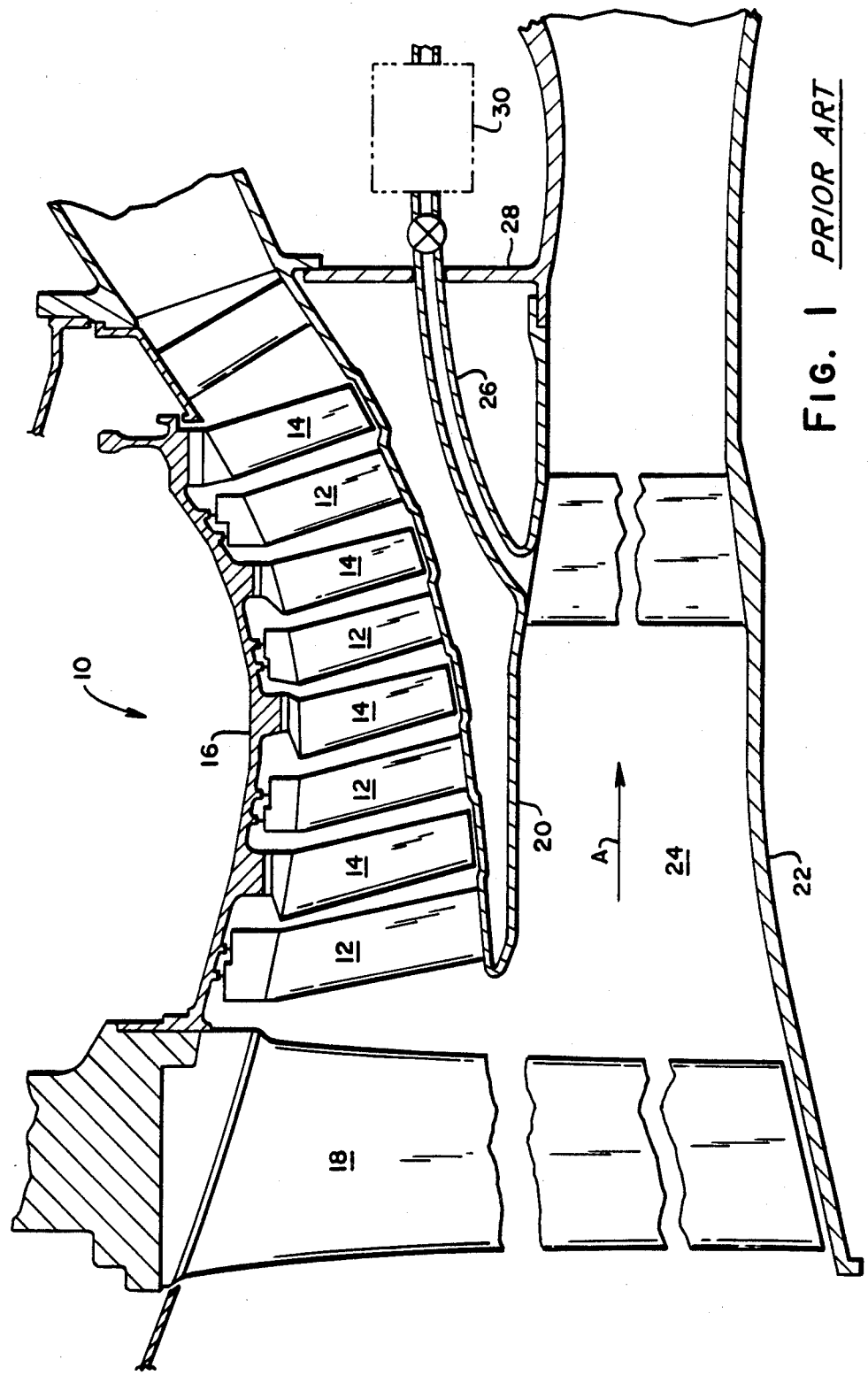
FIG. 1 is a partial view, partly in section and partly in schematic of a fan-jet engine showing a prior art system for feeding a heat exchanger with fan discharge air.

This invention is specific to a fan-jet engine, particularly, but not limited thereto to the dual spool axial flow type exemplified by the JT-8D, JT-9D and PW2037 manufactured by Pratt & Whitney Aircraft of United Technologies Corporation, the assignee of this patent application. As is typical, these engines comprise basically high and low pressure compressors and turbines and a fan driven off the low pressure spool. Obviously, the bearings supporting the high and low pressure shafts require a considerable amount of lubricating and cooling oil, as does other engine accessories. A common method of rejecting the heat from this oil is routing it through a heat exchanger so as to place it in indirect heat exchange with fan discharge air. A prior art system of this type is disclosed in FIG. 1 which shows the low pressure compressor spool generally illustrated by reference numeral 10 having a plurality of rows of stator vanes 12 and a plurality of rows of axial compressor blades 14. The low pressure shaft 16 driving the compressor blades also drives the fan 18.

The engine inner case 20 and engine outer case 22 define an annular passageway 24 directing the fan discharge air rearwardly to discharge in the direction of arrow A.

Fan discharge air is bled through conduit 26 through the intermediate case 28 to heat exchanger 30 mounted externally of the engine. As is customary a valve either manual or responsive to engine parameters will pass fan cooling air as desired. In actual practice, the hardware necessary to feed heat exchanger 30 may include a plenum chamber and ducting interconnecting the chamber and heat exchanger, together with the external connectors for passing the air through the engine case.

Figure 2:
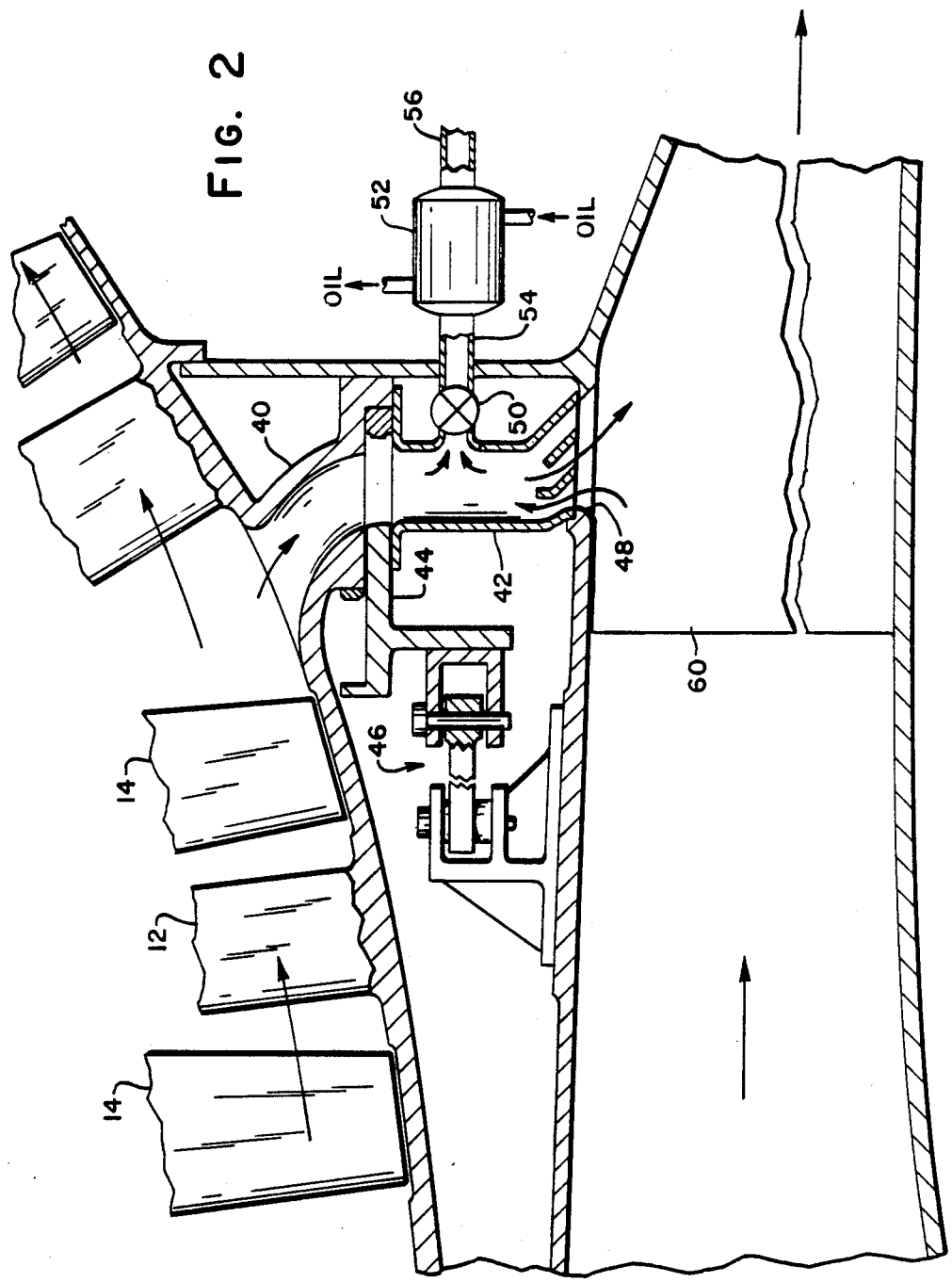
FIG. 2 is a partial view, partly in section and partly in schematic illustrating the surge bleed and air/oil heat exchange combined systems.

In accordance with this invention, as best seen in FIG. 2, the heat exchange system is combined with the surge bleed system to form an efficacious cooling system for the oil by installing the heat exchanger internally of the engine in the intermediate case between struts (not shown), while minimizing the plumbing hardware.

As can be seen from FIG. 2, air from the last row of compressor blades of the low spool compressor is bled through passage 40 to feed connecting line 42. Sliding valve 44, actuated by suitable actuating mechanism generally illustrated by reference numeral 46, serves to bleed the compressor at a given engine operating condition. The compressor discharge air is discharged into the fan discharge airstream and supplied to the cooler 52 when this valve is open. To take advantage of the momentum of the discharging air and minimize turbulence, the discharge end of connecting line 42 faces rearwardly to discharge the effluent air in the direction of the fan stream. The leading edge 48 of connecting line 42 is appropriately contoured to assure that the flow from the fan duct bled into duct 42 meets with minimum pressure losses.

It is apparent from the foregoing that when valve 44 is in the closed position flow from the fan discharge duct is bled into connecting line 42. Hence, when cooling flow is required, as dictated by valve 50, schematically shown, flow from connecting line 42 is fed to the heat exchanger 52 via line 54 for cooling the oil being admitted thereto in a well known manner. The effluent air is discharged through the discharge line 56, and since it is cooler than other parts of the engine, it may be utilized for further cooling or otherwise discharged overboard.

Inasmuch as the compressor bleed air is at a higher pressure than the fan discharge air, particularly at the lower power conditions of the engine, the heat exchanger core can therefore be designed to be sufficiently small (smaller than heretofore designs) to fit into the interior of the engine and still provide sufficient heat rejection.

Although the FIG. 2 shows the connecting line 42 communicating with the fan stream between struts 60 (one of several circumferentially spaced being shown) it will be noted that the connecting line 42 can be located in other locations along the fan discharge duct.

It should be understood that the invention is not limited to the particular embodiments shown and described herein, but that various changes and modifications may be made without departing from the spirit and scope of this novel concept as defined by the following claims.

We claim:

1. For a fan-jet engine having a fan discharge duct, a compressor having a high pressure compressor section and a low pressure compressor section, fluid connecting means interconnecting the compressor and the fan discharge duct, a heat exchanger located internally of said engine, means for leading a fluid medium intended to be cooled through said heat exchanger and duct means interconnecting said fluid connector means and said heat exchanger for selectively conducting compressor discharge air or fan discharge air to said heat exchanger, valve means for flowing and blocking the flow of compressor discharge air or fan discharge air to said heat exchanger, said fluid connecting means for interconnecting said compressor and fan discharge duct is the connection for the surge bleed system of said engine and a gate valve in said fluid connecting means operable to an open position to spill out compressor discharge air to prevent surge from ensuing.

2. For a fan-jet engine as in claim 1 wherein said fluid connecting means includes a duct-like element having an exit end mounted in the wall of said fan discharge duct, the upstream edge of said duct-like element being contoured to define an aerodynamic lip for flowing fan discharge air into said duct-like element.

3. For a fan-jet engine as in claim 2 wherein the inlet end of said interconnecting means of said surge bleed system is disposed between said high pressure compressor section and said low pressure compressor section.

* * * * *